Jan. 2, 1951   S. RUBEN   2,536,696
PRIMARY CELL
Filed Nov. 28, 1945
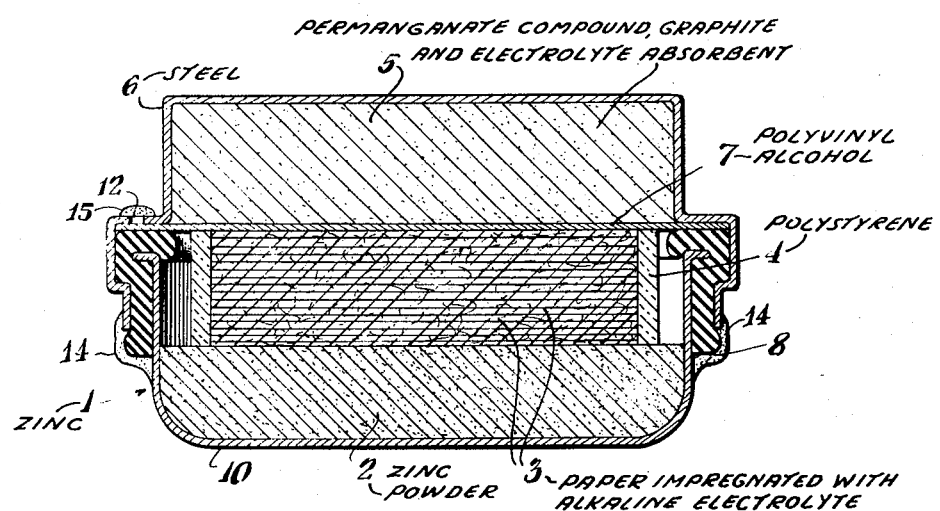
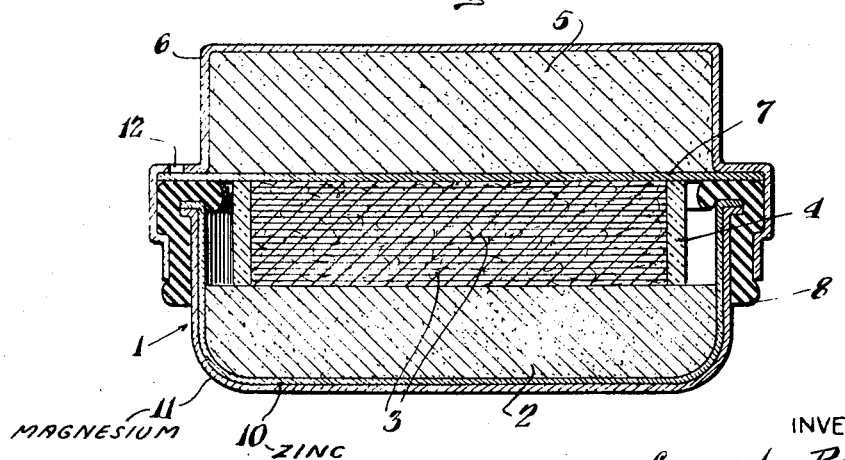
INVENTOR
Samuel Ruben
BY Chester F. Carlson
ATTORNEY Patented Jan. 2, 1951

2,536,696

UNITED STATES PATENT OFFICE 2,536,696

PRIMARY CELL

Samuel Ruben, New Rochelle, N. Y.

Application November 28, 1945, Serial No. 631,402

9 Claims. (Cl. 136—107)

This invention relates to electric current producing primary dry cells, more particularly, it relates to sealed dry type alkaline primary cells having a permanganate depolarizer.

Cells of this type which have been described in my copending applications Serial Numbers 575,090, filed January 29, 1945, 580,172, filed February 28, 1945, now Patent #2,499,419, issued March 7, 1950, 582,594, filed March 14, 1945, and 604,269, filed July 10, 1945, normally develop an internal resistance during the first few hours of their operation substantially higher than that present in the cell when first put into operation. Of these applications, Serial No. 575,090, now Patent No. 2,463,316, discloses and claims a conductive cathode containing an alkali metal permanganate, Serial No. 580,172, now Patent No. 2,499,419, discloses and claims a conductive cathode containing an alkaline earth metal permanganate, Serial No. 582,594, now Patent No. 2,462,998, discloses and claims a conductive cathode containing a silver or copper permanganate and Serial No. 604,269, now Patent No. 2,422,045, discloses and claims an alkaline dry cell having an immobilized electrolyte composed of an aqueous solution of an alkali metal hydroxide initially containing a substantial quantity of dissolved zinc.

The object of this invention is to produce an improved alkaline dry cell having a permanganate depolarizer.

A further object of this invention is to produce an alkaline dry cell having a permanganate depolarizer whose internal resistance can be maintained at substantially the same low level from the period of its initial operation throughout its life.

In accordance with this invention these and other objects and advantages which are incidental to its application can be attained by incorporating a small percentage of an electrolyte absorbent material throughout the permanganate cathode.

In the accompanying drawings which illustrate a preferred form of cell embodying features of this invention, Figure 1 is a sectional view of an alkaline dry cell of the button or flat type.

Figure 2 is a sectional view of a modified structure showing a bimetal anode cup.

The alkaline dry cell of this invention includes in general a cathode depolarizer formed of an electronically conductive coherent mass consisting principally of a permanganate compound, a barrier member, a spacer and electrolyte carrier and an anode all enclosed in an airtight container.

In a preferred embodiment of this invention the cathode depolarizer 5 consists of an intimate mixture of potassium permanganate ($KMnO_4$), graphite and magnesium silicate. While potassium permanganate is preferable, other suitable permanganate compounds include other alkali metal permanganates, such as sodium, lithium, rubidium or caesium, calcium permanganate or other alkaline earth metal permanganates such as barium, strontium, zinc and magnesium, silver permanganate, lead permanganate and copper permanganate.

Since these permanganate compounds are low in electronic conductivity, it is normally desirable to mix with them a conductive ingredient in as intimate contact as possible. The preferred ingredient is graphite although other conductive materials such as finely divided silver, conductive cadmium oxide, iron and the like may be used where they do not result in deleterious local reaction.

Where graphite is used micronized natural graphite such as Madagascar, Mexican, Ceylon or Zanzibar graphite has been found to give the best results. It can be used in various proportions, the most useful cathodes containing from one to fifty per cent (1 to 50%) graphite with five to fifteen percent (5 to 15%) graphite being preferred. The micronized graphite should have an extremely small particle size in the order of five to ten microns diameter. The graphite and finely powdered permanganate compounds are thoroughly mixed to form a graphite coating on the compound particles.

Permanganates in admixture with finely divided conductive materials make excellent depolarizer materials with which it is possible to produce cells which will show a flat voltage discharge curve with continuous output throughout a relatively long period of their life. However, the voltage during this relatively long period will not be as high as that which it is possible to obtain with a cell of this type in the first few hours of its life. The voltage drop during the initial period of operation is apparently due to the formation of a somewhat impervious brown crust on the cathode surface as a result of reduction of the permanganate. This crust appears to produce a high resistance layer which once formed controls the voltage of the cell.

I have now found that if electrolyte absorbent material is intimately mixed with the permanganate graphite mixture conductive electrolytic paths will be maintained throughout the high resistance brown crust-like layer. For best results, it is preferable to incorporate about two to thirteen percent (2 to 13%) by volume of such electrolyte absorbent material throughout the cathode.

The preferred electrolyte absorbent materials are those which form hydrogels such as silicia gel, magnesium silicate, aluminum silicate and other silicates. Other materials which form porous masses when compacted can also be used such as magnesium oxide, or hydroxide, powdered glass, ceramics or certain synthetic resin powders such as powdered polystyrene.

One example of a preferred cathode composition is a mixture of 90 grams of potassium permanganate, 10 grams of micronized Mexican graphite and 5 grams magnesium silicate.

The depolarizer is preferably made by compressing the finely divided permanganate and the graphite mixture into discs or plates at a pressure of about 50,000 pounds per square inch. The resulting product is then cracked and sifted through a screen to form particles of about 20 mesh size. A pellet made from these is converted into a tablet at about 2,500 pounds and consolidated into the can at about 10,000 pounds per square inch.

Effective barrier means is particularly essential with soluble depolarizer of high oxidizing value such as the permanganates. In this case a barrier 7 of very fine porosity and formed of a material which is not readily oxidizable by the depolarizer such as a fine porosity ceramic layer should be used. The barrier prevents direct contact of the solid depolarizer with any oxidizable organic spacer used such as paper and also retards dissolved depolarizer from reaching either the paper or the anode surface.

Contact of oxidizable mixture with the solid or dissolved permanganate depolarizer has two deleterious effects namely, 1. It oxidizes and carbonizes paper and
2. It consumes the available oxygen in the depolarizer.

In order to completely prevent circulation of dissolved depolarizer around the edge of the barrier, it is desirable that the edge of the barrier be cemented or sealed to the containing wall.

A spacing and electrolyte carrying material 3 is provided in the cell to space the electrodes and immobilize the electrolyte. Most any porous material which is not attacked by the alkali electrolyte is suited for this purpose. Dexter filter paper and pressed cotton fibre paper though less preferable due to low electrolyte absorption are good examples. However, other suitable porous materials may be used such as nylon fibre, polystyrene fibre, magnesium silicate, magnesium hydroxide, powdered silica jell or purified asbestos. When magnesium silicate is used, it is made into a jell by heating a mixture of 20 grams of magnesium silicate and 80 grams of the electrolyte at 80° C. for 4 hours. This jell is highly conductive, does not separate or flow with heat and is applied to the anode cup without the use of any other barrier. For some applications at low current drains, this is the preferred spacer and carrier of the electrolyte as it contains no organic material that can be oxidized.

The spacing means between the electrodes may thus include, as separate elements both a minutely porous barrier and a more porous electrolyte carrier. It is to be understood however, that the porous electrolyte carrier may be of such character as to serve the double function of electrolyte carrier and barrier means.

The preferred alkali metal hydroxide electrolyte consists of an aqueous solution of potassium hydroxide initially containing in solution a substantial quantity of zinc in the form of a compound or compounds commonly called "zincates."

The preferred range of concentration of the potassium hydroxide in the electrolyte for a cell of the construction shown in Figure 1 and most other cell structures is from thirty to fifty percent (30 to 50%) KOH. Concentrations above and below these limits can be used but generally result in lower cell output efficiencies. However, this depends considerably upon the cell construction and conditions of use and it is feasible with certain structures to depart rather widely from the preferred range, even to the extent of using such a high concentration of KOH as to produce an electrolyte which is solid at normal temperatures.

For minimum attack on the amalgamated zinc anode by the electrolyte when the cell is standing on open circuit, the electrolyte should contain all the zinc it will take up at the temperatures to which the cell is to be subjected. However, I have found that proportions of zincate down to about one-half this optimum concentration will, in many cases, particularly for moderate temperature uses, produce only minute gas generation, the rate being sufficiently slow to permit generated gas to diffuse out of the cell through the grommet or other sealing means without deleteriously affecting the desired airtight enclosure of internal cell elements. The quantity of zinc which will dissolve in the electrolytes appears to be proportional to the alkali concentration. It is preferred that the electrolyte shall contain about from ten to twenty grams (10 to 20 gms.) of zinc for each one hundred grams (100 gms.) of KOH present. The best range for electrolytes containing thirty to fifty percent (30 to 50%) KOH is about fifteen to seventeen grams (15 to 17 gms.) of zinc per one hundred grams (100 gms.) of KOH.

In the preferred cells of the present invention the electrolyte is neither consumed nor evaporated during shelf life and is continuously regenerated during cell operation so that its concentration and volume remains substantially constant. It is therefore necessary to provide only sufficient electrolyte adequately to wet the anode and cathode and provide a good conductive path through the spacer. In some instances as little as one cubic centimeter (1 cc.) of electrolyte per ampere-hour rating of the cell can be used.

If the alkaline solution is not saturated with zincate, the zinc hydroxide formed on the anode during the first period of cell operation may be dissolved until the electrolyte will not take up any additional zinc. Also, if such a cell is allowed to stand on open circuit for an extended period of time before first use, some of the zinc may be dissolved chemically with the accompanying formation of a small amount of hydrogen gas; but, if a substantial quantity of zincate is used, this rate will be very slow so that upon build-up of moderate pressure the gas may leak out through or past the neoprene grommet without endangering the desired airtight enclosure, and the life and operation of the cell will not be seriously affected thereby.

Although a potassium hydroxide electrolyte is preferred the present invention contemplates within its scope the possible use of other alkaline metal hydroxide electrolytes such as sodium hydroxide, lithium hydroxide and mixtures of such hydroxides as well as other suitable alkaline electrolytes such as the carbonates of potassium, sodium, lithium, caesium, and rubidium of which the potassium compound is the most desirable in relation to cost and performance.

The anode 2 should have its constituents (other than mercury introduced for amalgamation) formed predominantly of zinc. It may consist of substantially pure zinc or zinc alloyed with a minor amount of another metal which is capable of being amalgamated and is operable with zinc as anode material for example, zinc with a minor proportion of cadmium.

The zinc anode structure may take on any number of forms, however, it is preferable that they should have a large surface area such as can be obtained with rolled foil or compressed zinc powders. Where zinc is used in the form of powdered anodes, it has been found that a small amount of lead such as four to five hundredths (.04 to .05%) of 1 percent lead, in the zinc has an inhibiting effect on gas generation. However, metals which tend to produce serious local couples with zinc such as iron, copper and tin should preferably be kept to a low proportion such as below two-thousandths of one percent (.002%) in the anode.

In practice the zinc should be amalgamated before use in the cell to provide an unipotential surface and minimize the effect of impurity in producing local electric couples which would result in local electrochemical attack.

In Fig. 1 of the drawing illustrating a cell embodying features of this invention, the container 1 is formed of a sheet of zinc metal 10. The anode 2 which rests upon and makes contact with the zinc is a compressed pellet of amalgamated zinc powder 0.8 gram containing about .05% lead and about .002% cadmium. Spacer 3 housed in a polystyrene ring 4 is composed of 10 discs of .010" thick Dexter paper, a porous high purity paper, impregnated with an electrolyte solution containing seventy-five grams (75 gms.) of C. P. KOH to 100 milliliters of water (100 ml.) and twelve (12 gms.) of zinc oxide. .5 gram of electrolyte is used in the cell. Another preferred type of spacer for the cell is Webril paper (pure cotton fibres without a binder). It is normally used in this type of cell in the form of two pieces each 5 mils thick.

The cathode depolarizer 5 consists of a 2 gram compressed pellet made from a mixture containing 90 grams of potassium permanganate, 10 grams of micronized Mexican graphite and 5 grams of magnesium silicate. This material is housed within steel can top 6 with which it makes contact. A 3 mil thick disc 7 of suitable barrier material is interposed between spacer 3 and anode 5 and prevents migration of deleterious particles and free circulation of electrolyte. The zinc container and the steel can top which serve as terminals of the cell are isolated from each other by neoprene grommet ring 8 of L-shaped cross-section which rests on the container and against which the top is crimped down so as to seal the cell. In the assembly of the cell the paper spacer is compressed about 10% to insure adequate contact.

It is sometimes of advantage to coat the joint between the zinc metal 10, the grommet 8 and the steel cap 6 with an inert adhesive of the neoprene or polyvinyl chloride type. A coating of such adhesive is shown at 14 in Figure 1. This will insure against creepage of electrolyte and will be of particular advantage in those cases in which the top of the container is not crimped down sufficiently tight to make a good seal. A dot 15 of this cement if placed over vent hole 12 might also be of advantage. Another method of preventing external creepage of electrolyte illustrated in Figure 2 is to simultaneously press or form the anode cup from two sheets of metal each 20 mils thick the inner surface of the cup being formed by a 20 mil zinc layer 10 and the outer surface of the cup being formed by a 20 mil magnesium layer 11. Electrical terminal contact to the outer magnesium layer being obtained by percussion welding of a 5 mil steel strip to the magnesium.

If cell materials of reasonable purity are used there will be substantially no gas generation under normal operating conditions during the life of the cell or at the end of its effective life. The neoprene grommet 8 will permit sufficient gas diffusion to allow escape of any slight amount of gas which may be generated within the cell due to the local action, if any. If further preventing means are found desirable to provide for unusual conditions they may of course be provided. For example, a more porous neoprene grommet may be used which is impregnated with oil. Another suitable method is to provide the steel can 6 with a 10 mil vent hole in its shoulder at the point 12 which exposes a portion of the barrier sheet to the atmosphere so that if any excess gas pressure develops it can escape by pushing through the barrier and out through the vent.

While the above description and drawings submitted herewith disclose preferred and practical embodiment of the primary alkaline dry cell of the invention, it will be understood by those skilled in the art that the specific details of construction and arrangement of parts, as shown and described, are by way of illustration and not to be construed as limiting the invention.

What is claimed is:

1. A primary cell comprising a zinc anode, a cathode comprising an electronically conductive coherent mass of a permanganate compound in intimate mixture with an electrolyte absorbent hydrogel, a porous spacer between said anode and said cathode and in contact therewith, and an alkaline electrolyte absorbed in said spacer.

2. In a primary dry cell a permanganate cathode depolarizer containing magnesium silicate in admixture therewith.

3. A cathode depolarizer for dry alkaline cells comprising an intimate mixture of potassium permanganate, graphite and magnesium silicate.

4. A cathode depolarizer for dry alkaline cells comprising an intimate mixture of a permanganate, graphite and magnesium oxide.

5. A cathode depolarizer for dry alkaline cells comprising an intimate mixture of a permanganate and powdered glass.

6. A primary cell comprising an amalgamated zinc anode in intimate contact with an electrolyte retaining spacer, a cathode comprising an electronically conductive coherent mass of a permanganate compound in intimate mixture with an electrolyte absorbent material and in surface contact with a steel container, a zinc top cover insulated from the steel container and in pressure contact with the anode.

7. A primary cell comprising a zinc anode, a cathode comprising an electronically conductive coherent mass of a permanganate compound in intimate mixture with an electrolyte absorbent material, a porous spacer between said anode and said cathode and in contact therewith and an alkaline electrolyte absorbed in said spacer.

8. A primary cell comprising a zinc anode, a cathode comprising an electronically conductive coherent mass of a permanganate compound in intimate mixture with an electrolyte absorbent material, a porous spacer between said anode and said cathode and in contact therewith and an alkaline electrolyte absorbed in said spacer, said spacer including a porous barrier of ionically permeable material which is inert to said electrolye and to said permanganate, said porous barrier covering the electroylte-engaging surface of said permanganate cathode.

9. A primary cell comprising a zinc anode, a cathode comprising an electronically conductive coherent mass of a permanganate compound in intimate mixture with an electrolyte absorbent material, an immobilized body of alkaline electrolyte in contact with said anode and spaced from said cathode, and a porous barrier layer of ionically permeable material which is inert to said electrolyte and to said permanganate interposed between and in contact with said cathode and said body of electrolyte.

SAMUEL RUBEN.

REFERENCES CITED

The following references are of record in the file of this patent:

UNITED STATES PATENTS

| Number | Name | Date |
|---|---|---|
| 1,331,213 | Ruhoff | Feb. 17, 1920 |
| 1,494,059 | Burger | May 13, 1924 |
| 1,605,582 | Heise | Nov. 2, 1926 |

FOREIGN PATENTS

| Number | Country | Date |
|---|---|---|
| 163,744 | Great Britain | May 30, 1921 |

OTHER REFERENCES

Sholl, W. S., The Dry Battery (1940), page 35.